United States Patent [19]

Ekdahl et al.

[11] 4,334,257

[45] Jun. 8, 1982

[54] OVERVOLTAGE PROTECTION DEVICE

[75] Inventors: Per A. A. Ekdahl, Jäarfälla; Fred L. Möller, Varby, both of Sweden

[73] Assignee: Telefonaktiebolaget L M Ericsson, Stockholm, Sweden

[21] Appl. No.: 209,464

[22] PCT Filed: Feb. 14, 1980

[86] PCT No.: PCT/SE80/00046

§ 371 Date: Oct. 14, 1980

§ 102(e) Date: Sep. 26, 1980

[87] PCT Pub. No.: WO80/01741

PCT Pub. Date: Aug. 21, 1980

[30] Foreign Application Priority Data

Jul. 14, 1979 [SE] Sweden .............................. 7901321

[51] Int. Cl.³ ............................................ H02H 3/22

[52] U.S. Cl. .................................... 361/119; 361/129

[58] Field of Search ............... 361/119, 117, 129, 412; 337/29, 34; 313/324

[56] References Cited

U.S. PATENT DOCUMENTS

| | | | |
|---|---|---|---|
| 2,507,363 | 5/1950 | Baker | 361/129 |
| 3,917,982 | 11/1975 | George et al. | 337/34 X |
| 4,146,755 | 3/1979 | Caussé | 361/119 X |

*Primary Examiner*—Harry E. Moose, Jr.

*Attorney, Agent, or Firm*—Hane, Roberts, Spiecens & Cohen

[57] ABSTRACT

An overvoltage protection device for wires, preferably telephone cables, comprises overvoltage arresters (11) of the discharge tube type and connection clamps (7, 8) for the wires, which connection clamps are placed in a terminal block (2). The device is manufactured in such a manner that the overvoltage arresters (11) are enclosed in a detachable cassette (16) and so that the terminal box (2) is pivotal to allow for insertion and removal of the cassette (16). The cassette comprises a number of spaces for the overvoltage arresters (11) and a movable lock (19) to retain and to release the overvoltage arresters (11) respectively.

4 Claims, 10 Drawing Figures

A-A

C-C

OVERVOLTAGE PROTECTION DEVICE

FIELD OF THE INVENTION

The present invention relates to an overvoltage protection device for wires of the kind mentioned in the preamble of the following independent claim.

DESCRIPTION OF PRIOR ART

Overvoltage protection devices are known in which overvoltage arresters for separate wires for discharging overvoltage on a wire to ground are placed in separate boxes. An example of such an overvoltage protection device is described in the Swedish published patent application No. 361387. The separate overvoltage arresters in question both in the known overvoltage protection device and in the overvoltage protection device according to the invention are of the gas filled discharge tube type described in the Swedish published patent application No. 360507. A disadvantage of the known overvoltage protection device is that the exchange of separate overvoltage arresters is rather cumbersome since they are somewhat inaccessible and that in a telephone exchange a large number of them are present.

Furthermore overvoltage protection devices are known in which a number of overvoltage arresters are enclosed in a cassette. This is intended to be inserted in a space in the overvoltage protection device proper such that springs in the latter or in the cassette connect the overvoltage arresters to one wire each. When a fault, for example a shortcircuit, is suspected in some of the overvoltage arresters in the cassette, it is removed and replaced by a cassette with faultless overvoltage arresters. The overvoltage arresters in the removed cassette are then tested in a laboratory, often all of them simultaneously, and the overvoltage arrester found to be defective is replaced by a new one. A disadvantage of the cassette being designed in this way is that, if one of the overvoltage arresters is shortcircuited, and this is the most common reason for removing the cassette, when the cassette is being drawn out the shortcircuited overvoltage arrester on its way out shortcircuits several wires to earth for a short period of time. This results in disturbances on the shortcircuited wire which can be especially annoying if some of the wires are utilized for data transmission. Another disadvantage is that the exchange of an overvoltage arrester in the cassette can be as difficult as the exchange in an overvoltage protection device having overvoltage arresters in separate boxes.

SUMMARY OF THE INVENTION

The overvoltage protection device according to the invention is intended to offer a solution to the problem of providing overvoltage arresters forming part of the overvoltage protection device which are enclosed in a detachable cassette and which are easy to exchange in the cassette, and of ensuring that the cassette is easy to reach in the overvoltage protection device while annoying shortcircuits when exchanging the cassette are prevented.

An overvoltage protection device according to the present invention is characterized in a manner which appears from the characterizing part of the following independent claim.

With the overvoltage protection device according to the invention a solution of the posed technical problem is obtained.

BRIEF DESCRIPTION OF THE DRAWINGS

An embodiment of a overvoltage protection device according to the invention is described below with reference to the following drawings, in which.

PREFERRED EMBODIMENT

Figure 1:
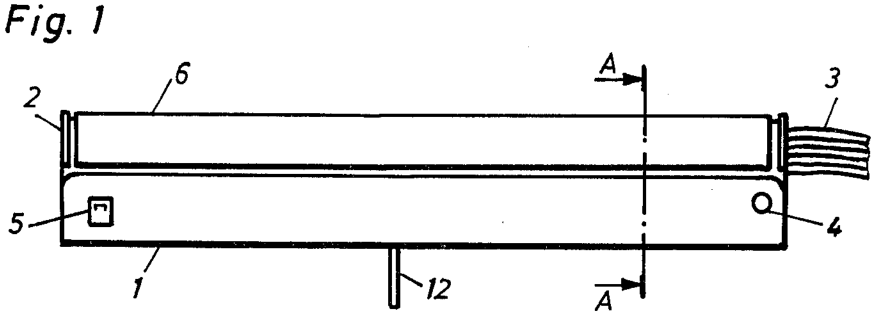
FIG. 1 shows an overvoltage protection device in a closed condition.
Figure 2:
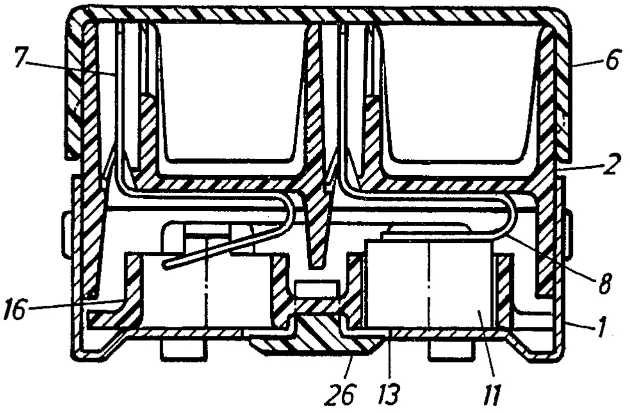
FIG. 2 shows a cross section through the overvoltage protection device.

The overvoltage protection device according to the invention, as appears from FIG. 1 and FIG. 2 comprises a holder 1 of sheet metal and a terminal block 2 of an insulating material which is fastened in the holder. The block is arranged to be pivotal about a pair of pins 4 protruding from the block into corresponding holes in the holder. In the end opposite to the pins 4 a pair of lugs 5 protruding from the block are arranged to engage corresponding square holes in the holder. The upper side of the block is covered by a casing 6 of an insulated material, which extends somewhat down the longitudinal sides of the block.

In the terminal block two rows of contact springs are placed, two of which 7, 8 are shown in FIG. 2. One of the contact springs 7 is shown in a rest position while the other 8 is shown pressing against the plane end surface of a cylindrical overvoltage arrester 11, the opposite end surface of which is pressed against the inner side of the holder 1. The metal holder 1 makes an electric contact between the overvoltage protection arrester 11 and ground; a metal fastening lub 12 riveted to the holder is arranged to hold the overvoltage protection device to a grounded rack in a telephone exchange and to supply current to the rack. The overvoltage protection device in the example is intended for ten pairs of wires and therefore is equipped with twenty contact springs and twenty overvoltage arresters.

The contact springs in this example are manufactured with two slots each to provide a connection with wires from the exchange and incoming lines, no stripping of the wires being necessary. The wires are gathered in bundles 3 going out from the terminal block 2 at the end where the pin 4 is located.

Figure 3:
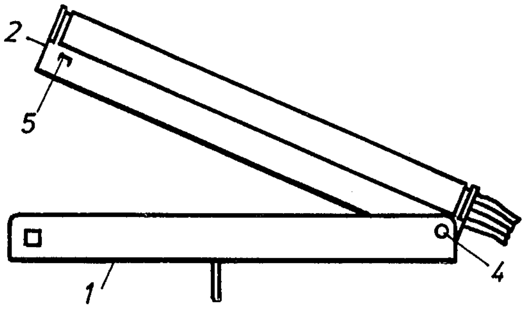
FIG. 3 shows the overvoltage protection device in an open condition.

The terminal block 2, as appears from FIG. 3, is pivotal about the pin 4, the space under the terminal block being accessible for mounting and removing overvoltage arresters 11.

Figure 4:
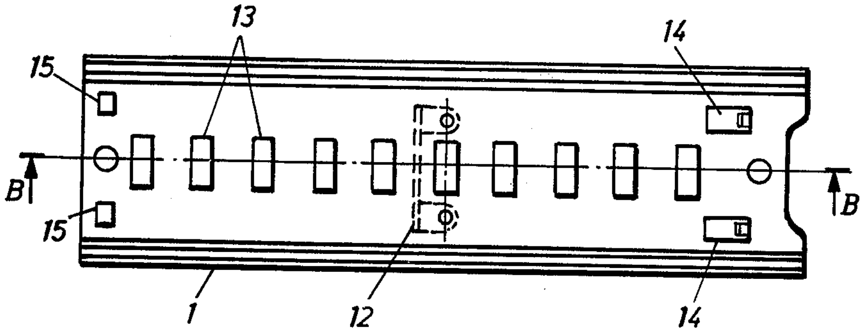
FIG. 4 shows a top view of a holder.
Figure 5:
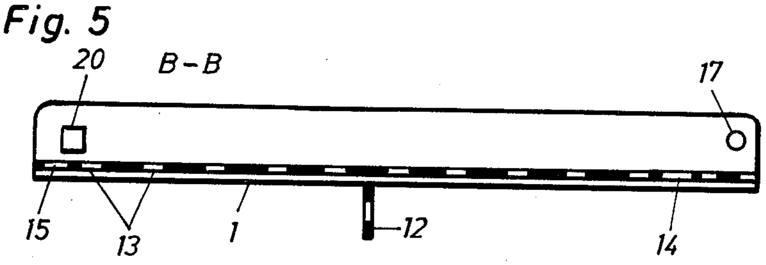
FIG. 5 shows a longitudinal section of the holder.
Figure 6:
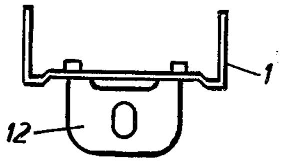
FIG. 6 shows an end view of the holder.

The holder 1, as appears from FIGS. 4, 5 and 6, is in the form of an elongated channel with a bottom and two upstanding sides. In the sides of the channel are provided a pair of round holes 17 for the pins 4 of the terminal block 2 and a pair of square holes 20 for locking the block to the holder. In the bottom of the holder is provided a row of rectangular holes 13 intended to make room for the lock described below for the overvoltage arresters. Furthermore in the bottom of the holder are provided a pair of rectangular holes 14 with bent up lugs in one of the short sides of the holes and a pair of somewhat smaller, rectangular holes 15. The purpose of the holes 14 and 15 will be described below.

Figure 7:
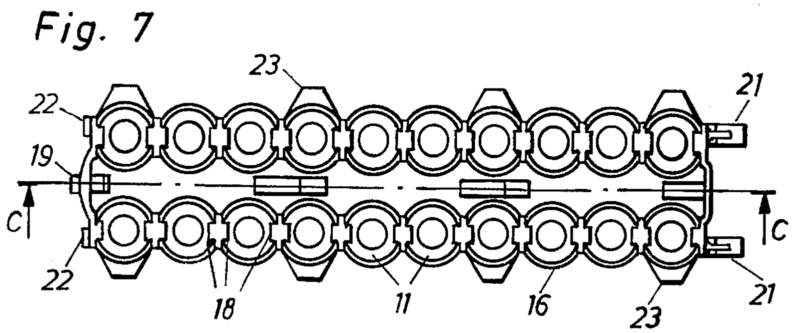
FIG. 7 shows a top view of a cassette.
Figure 8:
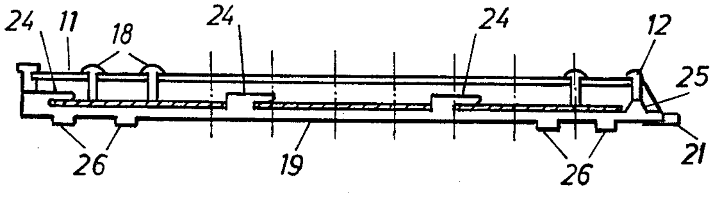
FIG. 8 shows a longitudinal section of the cassette.

The overvoltage arresters 11 included in the overvoltage protection device, as appears from FIGS. 7 and 8, are enclosed in a cassette 16 made of an insulating material. The cassette has two rows each containing 10 cylindrical spaces for the overvoltage arresters. The spaces are made to receive the overvoltage arresters with a large clearance. On the upper side of the cassette, hooks 18 are arranged to prevent the overvoltage arresters 11 from leaving the cassette upwards, and a lock 19 with bars 26 is placed on the bottom side of the cassette to prevent the overvoltage arresters from falling out downwards. Each overvoltage arrester 11 is freely movable within a space determined by the hole in the cassette, the hook 18 and the bar 26 so that the overvoltage arrester can accommodate to make proper contact between the contact spring and the holder 1.

Furthermore the cassette 16 is provided with a pair of hooks 21 for engaging the holes 14 in the holder 1 and with a pair of pegs 22 for insertion into the holes 15 in the holder. A number of supports 23 are arranged on both sides of the cassette bearing against the upstanding sides of the holder. The hooks 21, the pegs 22 and the supports 23 determine the position of the cassette 16 in the holder 1.

Figure 9:
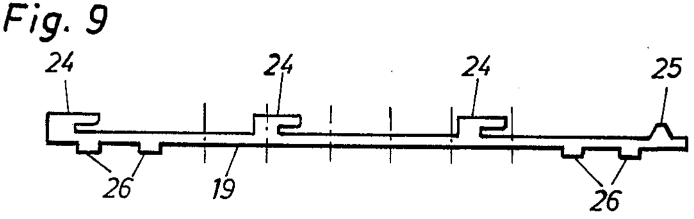
FIG. 9 shows a side view of a lock.
Figure 10:
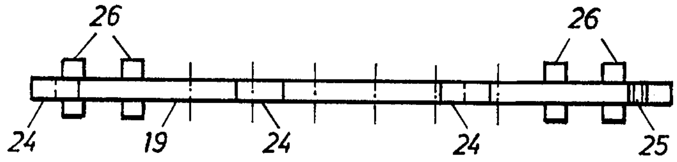
FIG. 10 shows a top view of the lock.

The lock 19, as appears from FIGS. 9 and 10, comprises a long, straight beam. Three claws 24 and a boss 25 are arranged on one of its flat sides. The claws 24, as shown in FIG. 8, are hooked from the bottom side of the cassette into rectangular holes in the latter and the boss 25 is located so as to prevent the claws from sliding out of their holes. By bending the lock beam the boss 25 can be released and the lock can be moved so that the claws are released from their holes and the lock can be removed from the cassette. Furthermore the lock is provided with as many bars 26 as there are pairs of overvoltage arresters 11, in this case ten bars. The bars 26 prevent, as mentioned, the overvoltage arresters from falling out of the cassette downwards, but when the lock 19 is removed, the overvoltage arresters 11 are free to be released from the cassette.

The earlier mentioned holes 13 in the holder 1 allow the bars 26 to penetrate through the bottom of the holder, see particularly FIG. 2, so that the overvoltage arresters 11 can be pressed directly against the bottom of the holder.

What we claim is:

1. An overvoltage protection device for wires, preferably telephone wires, comprising overvoltage arresters (11) of the discharge tube type and connection clamps (7, 8) for the wires, said connection clamps being mounted in a terminal block (2) and pressed against one of the poles of the overvoltage arresters (11), the opposite pole of the overvoltage arresters being supported against a holder (1) formed of sheet metal and providing a ground connection, characterized in that the overvoltage arresters (11) are enclosed in a detachable cassette (16) of insulating material placed in a space between the terminal block (2) and the holder (1), and in that terminal block (2) is pivotal about pins (4) at one of its ends, thereby allowing access to the space between the terminal block (2) and the holder (1) for insertion and removal of the cassette (16).

2. An overvoltage protection device according to claim 1, characterized in that said cassette (16) is provided with a number of spaces for receiving the overvoltage arresters (11) and with a movable lock (19) arranged to hold the mounted overvoltage arresters in one end position and to release them in the opposite end position.

3. An overvoltage protection device according to claim 1, characterized in that, in order to determine its position in the holder (1), said cassette (16) is provided at one of its end with hooks (21) and at its other end with pegs (22), said hooks and pegs corresponding to holes (14, 15) in the holder (1), and a number of supports (23) protrude from the sides of the cassette so as to bear against the inner sides of the holder.

4. An overvoltage protection device according to claim 1, characterized in that the connection clamps (7, 8) of the terminal block (2) for the wires are adapted to be disconnected from all the poles of the overvoltage arresters (11) approximately simultaneously as the terminal block (2) is pivoted away form the sheet metal holder (1).

* * * * *